(12) United States Patent
Fischer et al.

(10) Patent No.: US 11,947,097 B2
(45) Date of Patent: Apr. 2, 2024

(54) BANDPASS FILTER FOR LIGHT HAVING VARIABLE LOWER AND UPPER CUT-OFF WAVELENGTHS

(71) Applicant: Abberior Instruments GmbH, Goettingen (DE)

(72) Inventors: Joachim Fischer, Karlsruhe (DE); Matthias Henrich, Heidelberg (DE); Andreas Schoenle, Goettingen (DE); Lars Kastrup, Goettingen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 533 days.

(21) Appl. No.: 17/223,074

(22) Filed: Apr. 6, 2021

(65) Prior Publication Data
US 2021/0223528 A1 Jul. 22, 2021

Related U.S. Application Data

(63) Continuation-in-part of application No. PCT/EP2019/077013, filed on Oct. 7, 2019.

(30) Foreign Application Priority Data

Oct. 8, 2018 (DE) .......................... 102018124714.1

(51) Int. Cl.
*G02B 26/08* (2006.01)
*G02B 5/20* (2006.01)
(Continued)

(52) U.S. Cl.
CPC .......... *G02B 21/0032* (2013.01); *G02B 5/20* (2013.01); *G02B 21/0048* (2013.01); *G02B 26/101* (2013.01)

(58) Field of Classification Search
CPC .. G02B 21/0032; G02B 5/20; G02B 21/0048; G02B 26/101; G02B 21/002;
(Continued)

(56) References Cited

U.S. PATENT DOCUMENTS

| 4,225,233 A | 9/1980 | Ogan |
| 5,969,868 A | 10/1999 | Bornhorst et al. |

(Continued)

FOREIGN PATENT DOCUMENTS

| DE | 100 38 049 A1 | 2/2002 |
| DE | 10 2006 034 908 A1 | 1/2008 |

(Continued)

OTHER PUBLICATIONS

Sutter Instrument Co., "Lambda DG-4 and Lambda DG-5 Ultra-High-Speed Wavelength Switching Illumination System Operation Manual", Rev. 3.05B, Novato, CA, USA (Sep. 10, 2013), URL: https://www.sutter.com/manuals/LBDG-4_5_OpMan.pdf.
(Continued)

*Primary Examiner* — Euncha P Cherry
(74) *Attorney, Agent, or Firm* — Thomas | Horstemeyer, LLP

(57) ABSTRACT

A bandpass filter for light has variable lower and upper cut-off wavelengths. The bandpass filter comprises an areal long-pass filter defining the variable lower cut-off wavelength and an areal short-pass filter defining the variable upper cut-off wavelength. The long-pass filter has different lower cut-off wavelengths in different first area regions which follow to one another in a first direction, and the short-pass filter has different upper cut-off wavelengths in different second area regions which follow to one another in a second direction. The long-pass filter and the short-pass filter are connected in series and spatially fixed relative to
(Continued)

one another. The first direction and the second direction are oriented crosswise to one another.

18 Claims, 5 Drawing Sheets

(51) Int. Cl.
  *G02B 21/00* (2006.01)
  *G02B 26/10* (2006.01)
(58) Field of Classification Search
  CPC .. G02B 21/0076; G02B 26/023; G02B 26/08; G01N 2021/6471
  See application file for complete search history.

(56) References Cited

U.S. PATENT DOCUMENTS

| | | | |
|---|---|---|---|
| 6,809,815 B2 | 10/2004 | Knebel | |
| 7,554,664 B2 | 6/2009 | Wolleschensky et al. | |
| 8,699,130 B2 | 4/2014 | Wolleschensky | |
| 8,922,776 B2 | 12/2014 | Rygiel | |
| 9,733,124 B2 | 8/2017 | Schappacher | |
| 10,775,599 B2 | 9/2020 | Gugel et al. | |
| 2005/0017197 A1* | 1/2005 | Ulrich | G02B 21/008 250/458.1 |
| 2014/0226204 A1 | 8/2014 | Mitzkus et al. | |
| 2014/0312212 A1 | 10/2014 | Schappacher | |

FOREIGN PATENT DOCUMENTS

| | | |
|---|---|---|
| DE | 10 2009 012 874 A1 | 9/2010 |
| DE | 10 2010 060 747 B4 | 4/2014 |
| DE | 10 2013 002 423 A1 | 8/2014 |
| DE | 20 2016 008 334 U1 | 9/2017 |
| EP | 3 333 611 A1 | 7/2017 |

OTHER PUBLICATIONS

Claus B. Mueller and Joerg Ende.rlein: "Image Scanning Microscopy", Physical Review Letters, May 14, 2010, PRL 104, 198101 (2010).

Written Opinion of the International Search Report for co-pending, related PCT Application No. PCT/EP2019/077013.

* cited by examiner

BANDPASS FILTER FOR LIGHT HAVING VARIABLE LOWER AND UPPER CUT-OFF WAVELENGTHS

CROSS REFERENCE TO RELATED APPLICATIONS

This application is a continuation in part to international application PCT/EP/2019/077013 entitled "Bandpass Filter for Light having variable lower and upper cut-off Wavelengths", filed on Oct. 7, 2019 and claiming priority to German patent application No. 10 2018 127 714.1 entitled "Bandpassfilter für Licht mit variabler unterer und oberer Grenzwellenlange" and filed on Oct. 8, 2018.

FIELD OF THE INVENTION

The invention relates to a bandpass filter for light having variable lower and upper cut-off wavelengths. More particularly, the present invention relates to a bandpass filter for light, the bandpass filter having a variable lower cut-off wavelength which is defined by an areal long-pass filter, wherein the long-pass filter has different lower cut-off wavelengths in different area regions which follow to one another in a first direction, and a variable upper cut-off wavelength which is defined by an areal short-pass filter, wherein the short-pass filter has different upper cut-off wavelengths in different area regions which follow to one another in a second direction, wherein the long-pass filter and the short-pass filter are connected in series. Further, the invention relates to apparatuses for selecting a wavelength range out of a light beam by means of such a bandpass filter.

The selection of a wavelength range out of a light beam may, for example, serve for selecting a certain wavelength range out of a light beam which is more broadband with regard to the wavelengths included as excitation light for a dye in laser-scanning microscopy, for example. Another application of such an apparatus is to detect light intensities of a light beam selectively with regard to wavelength, thus, for example, only the light intensities in a selected wavelength range or the distribution of the light intensities over different wavelength ranges. This may also take place in laser-scanning microscopy, namely in the detection beam path for the fluorescence light emitted by the respective dye

BACKGROUND OF THE INVENTION

A beam splitter for use in a detection beam path of a laser-scanning microscope, which consists of a gradient filter shiftable within the beam path for adjustable wavelength dependent splitting of detection light in a transmitting and a reflected part is known from DE 10 2006 034 908 A1 and U.S. Pat. No. 7,554,664 B2 belonging to the same patent family. The gradient filter displays a continuous spatial variation of the cut-off wavelengths between the reflected and the transmitted to part of the detection light and may be made as a short-pass, a long-pass or a bandpass filter. The reflected and the transmitted parts of the light beam are measured by two separate detectors.

A laser-scanning microscope having a detection beam path for detection of spectral components of light radiation excited in a specimen in a plurality of detection channels is known from DE 10 2009 012 874 A1 and U.S. Pat. No. 8,699,130 B2 belonging to the same patent family. The light radiation arrives at a variable long-pass or short-pass filter. The long-pass or short-pass filter is a variable edge filter which has different splitting into transmitted wavelength components and reflected wavelength components along its longitudinal extension. Components of the light radiation reflected and/or transmitted by the long-pass or short-pass filter are reflected by a reflector back onto the long-pass or short-pass filter at a parallel offset, and they are again reflected or transmitted by the long-pass or short-pass filter before they then get to one of a total of four detectors. Two of the four detectors then measure components of the light radiation which have been once reflected and once transmitted by the long-pass or short-pass filter and which thus fall into a wavelength with upper and lower limits. On the other hand, the two other detectors measure components of the light radiation which have been transmitted or reflected twice and which are thus only delimited in one direction with regard to their wavelength.

A confocal laser-scanning microscope having at least two detector units which detect detection light passing through a detection pinhole is known from DE 10 2010 060 747 B4 and U.S. Pat. No. 8,922,776 B2 belonging to the same patent family. An optical element which splits the detection light into at least two beam bundles and spectrally decomposes the detection light within the beam bundles is arranged in the beam direction between the detection pinhole and the detector units. Prior to detection, a wavelength range of the beam bundles is limited by means of a spectrally limiting element, wherein the spectrally limited element is disposed shiftably and/or rotatably for varying the wavelengths detected. Further, the optical element may separate the detection light into three or more beam bundles and spectrally divide the light within the beam bundles.

For example from DE 20 2016 008 334 U1 and U.S. Pat. No. 10,775,599 B2 belonging to the same patent family, it is known to spectrally split up a light beam in that it is directed onto dichroitic interfaces with different cut-off wavelength between transmission and reflection, the dichroitic interfaces being formed at different optical elements.

An optical arrangement for selection and detection of the spectral region of a light beam in a confocal scanning microscope is known from DE 100 38 049 A1 and U.S. Pat. No. 6,809,815 B2 belonging to the same patent family. The optical arrangement comprises a means for spectral dispersion of the light beam, a means for selecting a definable spectral region and a detection apparatus. The relative positions of the spectrally dispersed light beam and the detection apparatus are variable for influencing the spectral region to be detected. Thus, it is sufficient, if the detection apparatus only has one detector. Particularly, the variation of the relative position of the spectrally dispersed light beam and the detection apparatus may be achieved by rotating and/or shifting a mirror which is arranged upstream of the means for spectral dispersion. A prism, or a reflection or a transmission grating may be used as the means for spectral dispersion.

A spectrometer for providing output light with a predetermined wavelength, in which the wavelength is predetermined by means of a scanning element, is known from U.S. Pat. No. 4,225,233 A. The scanning element is a small rotating or tilting mirror in an image of a reflecting grating of the spectrometer, whose angular position is varied. The light reflected by the mirror is passed through a slit to provide the output light with the predetermined wavelength. By varying the angular position of the mirror by means of a galvanometer, the spectrum of the light beam incident on the grating can be scanned.

An apparatus with two one-axis or single tilting axis tilting mirrors in form of galvanometer scanner mirrors and an interference filter for wavelength selection is known from Sutter Instrument Co., "Lambda DG-4 and Lambda DG-5 Ultra-High-Speed Wavelength Switching Illumination System Operation Manual", Rev. 3.05B, Novato, Calif., USA (Sep. 10, 2013), URL: https://www.sutter.com/manuals/LBDG-4_5_OpMan.pdf. Light from a Xenon arc bulb is focused onto the first galvanometer scanning mirror which directs the light via a parabolic mirror onto one of several filter channels of the interference filter. A second parabolic mirror which focuses the transmitted light, independently of its deviation by means of the first galvanometer scanning mirror, into a spatially fixed focal point on the second galvanometer scanner is arranged behind the interference filter. The second galvanometer scanner directs the light with the wavelength selected by the interference filter into a light guide. The interference filter has different surface regions in which it selects different wavelengths, and onto which the light can be directed by means of the first galvanometer scanning mirror.

There still is a need of a bandpass filter for light, by which a wavelength range to be selected can be easily set with regard to both position and bandwidth

SUMMARY OF THE INVENTION

The invention relates to a bandpass filter for light having variable lower and upper cut-off wavelengths. The bandpass filter comprises an areal long-pass filter defining the variable lower cut-off wavelength. The long-pass filter has different lower cut-off wavelengths in different first area regions which follow to one another in a first direction. The bandpass filter further comprises an areal short-pass filter defining the variable upper cut-off wavelength. The short-pass filter has different upper cut-off wavelengths in different second area regions which follow to one another in a second direction. The long-pass filter and the short-pass filter are connected in series, and they are spatially fixed relative to one another. The first direction and the second direction are oriented crosswise to one another.

The invention also relates to an apparatus for selecting a wavelength range from a light beam. The apparatus comprises a bandpass filter of the invention and a beam shifting device which is configured to shift the light beam, transversely with regard to its propagation direction, relative to the bandpass filter.

The invention also relates to a laser-scanning microscope comprising at least one apparatus of the invention in at least one of its excitation beam path and its detection beam path.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
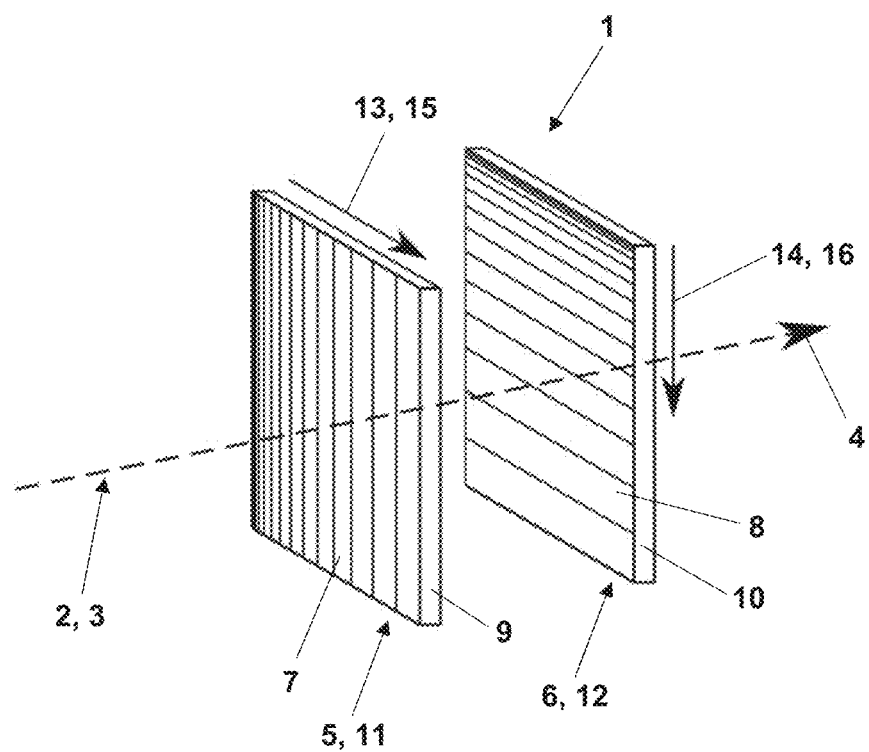
FIG. 1 shows a long-pass filter and a short-pass filter connected thereto in series of a first embodiment of the bandpass filter according to the invention in a schematic perspective depiction.

The bandpass filter comprises a variable lower cut-off wavelength defined by an areal long-pass filter, wherein the long-pass filter has different lower cut-off wavelengths in different area regions which follow to one another in a first direction, and a variable upper cut-off wavelength defined by an areal short-pass filter, wherein the short-pass filter has different upper cut-off wavelengths in different area regions which follow to one another in a second direction. The long-pass filter and the short-pass filter are connected in series, the long-pass filter and the short-pass filter are spatially fixed relative to one another, and the first direction and the second direction are oriented crosswise to one another.

The bandpass filter has a passage area with different area regions which are arranged side by side in the first and the second directions and which differ from one another with regard to the lower and/or upper cut-off wavelength of the bandpass filter. Not only the position but also the bandwidth of the wavelength range which is selected from an incident light beam varies over the different area regions. The lower cut-off wavelength set by the long-pass filter varies between area regions following to one another in the first direction, whereas the upper cut-off wavelength of the bandpass filter set by the short-pass filter varies between area regions following to one another in the second direction. Both the lower and the upper cut-off wavelengths vary with area regions following to one another in an intermediate direction between the first and the second directions, wherein the bandwidth of the selected wavelength range may remain constant. The statement that only the lower cut-off wavelength varies in the first direction and only the upper cut-off wavelength varies in the second direction applies strictly, if the two directions are orthogonal to one another in a projection onto the area of the bandpass filter or along a beam path in which the long-pass filter and the short-pass filter are connected in series. However, the variability both with regard to the position and the bandwidth of the wavelength range selected does not require such an orthogonal course of the two directions. For this purpose, it is sufficient if the first and the second directions are oriented crosswise to one another in that they are linearly independent in the projection defined above. However, in practice, it is preferred that the smaller angle between the two directions is not smaller than 30°, 45° or 60°. More preferably it is not smaller than 75°, and it is about 90°.

The two directions may be two linear directions which are orthogonal to one another. However, the one of the two directions may be a radial direction with regard to the optical axis of the beam path, whereas the other direction may be a circumferential or azimuthal direction orthogonal thereto.

In the bandpass filter, the long-pass filter and the short-pass filter may be fixed relative to one another such that light which is incident on a certain area region of the front long-pass filter or short-pass filter and is then incident on an area region of the respective back short-pass filter or long-pass filter which is one-two-one associated with the first area region. In other words, the areal long-pass filter and the areal short-pass filter are typically fixed relative to one another at a small distance.

The long-pass filter and the short-pass filter may be independently selected from interference filters and colored filters.

The long-pass filter and the short-pass filter may be cemented to one another, even areally when using a transparent optical cement. In another embodiment, a first thin film system forming the long-pass filter and a second thin film system forming the short-pass filter are arranged on a same substrate, for example on its front side and its back side. In another embodiment, a first thin film system forming one of the long-pass filter and the short-pass filter are arranged on a colored glass products or colored filter glass forming the other one of the short-pass filter and the long-pass filter.

The lower cut-off wavelength of the long-pass filter may monotonically increase in the first direction. Correspondingly, the upper cut-off wavelength of the short-pass filter may monotonically decrease in the second direction. This implies the possibility that the lower and/or the upper cut-off wavelength increases stepwise, i. e. in discrete steps. With orthogonal first and second directions this results in a chess pattern of different area regions of the bandpass filter with different positions and bandwidths of the wavelength range selected.

The lower cut-off wavelengths of the long-pass filter may strictly monotonically or even linearly increase in the first direction. Similarly, the upper cut-off wavelengths of the short-pass filter may strictly monotonically or linearly decrease in the second direction. Then, each of the long-pass filter and the short-pass filter is a so-called graduated or gradient filter. By means of two such gradient filters, one used as a long-pass filter and one used as a short-pass filter, whose gradients are oriented crosswise to one another, a plurality of wavelength ranges which are different with regard to position and bandwidth can be selected with the bandpass filter. Across no area region of the bandpass filter, which has finite dimensions, the lower cut-off wavelength and the upper cut-off wavelength are exactly constant; but with not too high gradients of the gradient filters and with not too large area regions considered, the variations occurring here may be neglected.

Simple conditions with regard to the assignment of the different area regions of the bandpass filter to certain lower and upper cut-off wavelengths result, if a first gradient of the lower cut-off wavelength of the long-pass filter in the first direction and a second gradient of the upper cut-off wavelength of the short-pass filter in the second direction have a same constant value.

It is to be understood that, in the bandpass filter according to the present disclosure, the lower cut-off wavelength, at least in some of the area regions of the long-pass filter, is smaller than the upper cut-off wavelength in some of the area regions of the short-pass filter. As the bandpass filter according to the present disclosure can only be used at all there, where such area regions of the long-pass filter and the short-pass filter are combined with one another that the lower cut-off wavelength is not higher than the upper cut-off wavelength, the highest cut-off wavelength of the short-pass filter should not be smaller than the smallest lower cut-off wavelength of the long-pass filter.

On the other hand, if the highest lower cut-off wavelength is smaller than the smallest upper cut-off wavelength, the bandpass filter is active over the entire overlap of the long-pass filter and the short-pass filter but there are very few selectable wavelength ranges with small bandwidth. Thus, it proves to be advantageous, if a first wavelength range spanned by the lower cut-off wavelength of the long-pass filter in the first direction and a second wavelength range spanned by the upper cut-off wavelength of the short-pass filter in the second direction overlap by at least 25% or by at least 50% or by at least 75% or even by 100%. This overlap directly defines the wavelength ranges with small bandwidth, which can be selected. Vice versa, with increasing overlap, the area of the inactive area region of the bandpass filter increases up to 50% (with 100% overlap, assuming symmetric conditions).

The apparatus for selecting a wavelength range from a light beam comprising the bandpass filter further comprises a beam shifting device which is configured to shift the light beam, transversely with regard to its propagation direction, with regard to the bandpass filter. The beam shifting device, for example, shifts the bandpass filter with regard to the spatially fixed light beam, transversely with regard to its propagation direction, so that the light beam is incident on a region of the passage area of the bandpass filter, in which an area region of its long-pass filter having the desired lower cut-off wavelength and an area region of its short-pass filter having the desired upper cut-off wavelength follow to one another in an arbitrary sequence to select the desired wavelength range.

However, it often proves to be complex to quickly and precisely shift the bandpass filter, which has typical dimensions in the first and the second directions of some centimeters, with regard to the spatially fixed light beam to, for example, select precisely defined wavelength ranges one after the other, the mass inertia of the bandpass filter also being relevant. Thus, it is preferred to that the beam shifting device is configured to shift the light beam with regard to the static bandpass filter by means of, for example, tilting mirrors.

In any case, in the apparatus according to the present disclosure, a point-shaped light detector or a two-dimensional light detector may be arranged downstream of the bandpass filter. The point-shaped light detector is to be assigned to the light beam, i. e. to be arranged on a continuation of the light beam downstream of the bandpass filter so that it is always hit by the light beam as long as the light beam passes through the bandpass filter due to the wavelengths included. On the other hand, the two-dimensional light detector may be associated with the bandpass filter so that different regions of the light detector register the light intensities passing through different regions of the passage area of the bandpass filter. If the light beam, by means of the beam shifting device, is directed to different regions of the passage area of the bandpass filter one after the other, while the light intensities getting to the light detector are registered, the spectral composition of the light beam can be analyzed. In doing so, side by side wavelength ranges of higher bandwidth may be measured at first, and only those wavelength ranges for which light intensities have been registered may be split up in smaller wavelength ranges.

A two-dimensional light detector which resolves the point of incidence of the light of the light beam can also be arranged in the continuation of the light beam downstream of the bandpass filter in such a way that it is always hit by the light beam as long as light beam passes through the bandpass filter due to the wavelengths included. For example, from Claus B. Müller and Jörg Enderlein: Image Scanning Microscopy, Phys. Rev. Lett. 104, 198101 (2010), a method with detection that is confocal with regard to a focused excitation is known, in which a diffraction image of the detection light is recorded with a two-dimensional light detector and evaluated afterwards. Both in such a method and in methods with confocal detection with a point-shaped light detector, the apparatus may be used to quickly switch between different detection wavelengths so that a quasi-simultaneously detection of detection light with the different detection wavelengths is achieved.

In the apparatus for selecting a wavelength range from a light beam, a further similar bandpass filter may be arranged in a beam path of a part of the light beam that is reflected by the first bandpass filter and that has wavelengths outside the wavelength range selected by the bandpass filter, a further wavelength range being selectable from the light beam by the further bandpass filter. In an analogous way, an even further similar bandpass filter may be arranged in a part of the light beam that is reflected by the further bandpass filter and that has wavelengths outside of the wavelength ranges selected by the bandpass filter and the further bandpass filter to select one more further wavelength range from the light beam.

In order to make full use of the areal bandpass filter, the beam shifting device is preferably two-directional so that the light beam is shiftable by it in two different, for example two orthogonal, directions, transversely with regard to the propagation direction of the light beam, relative to the bandpass filter.

In one practical embodiment, the beam shifting device of the apparatus may has a two-axes tilting mirror, an optic focusing the light beam onto the tilting mirror, an off-axis parabolic mirror collimating the light beam deflected by the tilting mirror, and a further off-axis parabolic mirror focusing the collimated light beam onto a spatially fixed focal point, wherein the bandpass filter is arranged between the two off-axis parabolic mirrors. With different tiltings of the two-axes tilting mirror about its two tilting axes, the collimated light beam gets onto and through different area regions of the bandpass filter according to the invention.

In another practical embodiment, the beam shifting device of the apparatus according to the invention comprises a light guide supplying the light beam, an optic collimating the light beam emerging out of the light guide, a first one-axis tilting mirror and a second one-axis tilting mirror, which deflect the collimated light beam one after the other in two different directions, a full mirror for the deflected light beam, a lens combination focusing the deflected light beam orthogonally onto the full mirror and including a lens which is rotationally symmetric with regard to a rotation axis, and an edge mirror separating the light beam reflected by the full mirror from the light beam emerging out of the light guide and collimated by the lens. The bandpass filter is arranged close to the full mirror and tilted with regard to the full mirror to such an extent that a part of the light beam reflected by the bandpass filter and having wavelengths outside the wavelength range selected by means of the bandpass filter is reflected out of the further beam path by means of the bandpass filter. The light beam reflected by the full mirror having the selected wavelength range is once again collimated upon once again passing through the lens combination in backward direction and de-scanned by the tilting mirrors. The rotation axis of the rotationally symmetric lens is arranged at an parallel offset with regard to a beam axis with zero excursion of the tilting mirrors in such a way that the light beam reflected by the full mirror, after passage through the lens combination, is laterally shifted with regard to the incident light beam to such an extent that it is separable by means of the edge mirror from the light beam emerging out of the light guide and collimated by the lens. In this apparatus according to the invention, the light beam passes through the respective area region of the bandpass filter according to the invention twice, so that the selectivity for the selected wavelength range is increased.

The two different directions in which the two tilting mirrors of this embodiment of the apparatus according to the invention deflect may be orthogonal to one another, wherein the tilting axis of the first tilting mirror passes through an input-side focal point of the rotationally symmetric lens. The lens combination may further include a cylinder lens, which has a cylinder axis that is parallel to the tilting axis of the second tilting mirror, which is arranged close to the full mirror and which, in a projection along the tilting axis of the second tilting mirror, shifts an input-side focal point of the lens combination onto the tilting axis of the second tilting mirror. In this way, by means of the cylinder lens, tilting of the beam in two directions without simultaneous alteration of the beam position is enabled, even without imaging the tilting mirrors onto one another.

The combination of two tilting mirrors deflecting a collimated light beam in two directions which are orthogonal to each other with a rotationally symmetric lens whose input side focal point lies on a tilting axis of the first tilting mirror and a cylinder lens which is located as close as possible to an output side focal point of the rotationally symmetric lens, which has a cylinder axis that is parallel to the tilting axis of the second tilting mirror and which, in a projection along the tilting axis of the second tilting mirror, shifts an input side focal point of the lens combination onto the tilting axis of the second tilting mirror, so that, even without imaging the tilting mirrors onto one another, a shift of the beam in two directions in the focal plane of the rotationally symmetric lens is possible without a simultaneous tilt, which combination is included in this embodiment of the apparatus, is to be seen as an invention on its own. The application of this invention in an optical scanner allows for tilting a light beam without simultaneous alteration of the beam position in the pupil plane of an objective by using an additional lens. This invention on its own is independent of further components of the apparatus defined in the claims.

In the laser-scanning microscope, at least one apparatus according to the invention is provided in at least one of an excitation beam path and an detection beam path to, for example, select, from a light beam coming from a broad bandwidth light source, a narrow bandwidth wavelength range as excitation light, or to select, from the light coming from a sample, a certain wavelength range as fluorescence light to be detected.

Insofar as light, particularly of a light beam, is mentioned here, this refers to light belonging to the visible and the adjacent infrared and ultraviolet ranges. Correspondingly, the wavelengths and thus also the lower wavelength limits and upper wavelength limits may be in a range from a few 100 nm to a few 1,000 nm. Often, the wavelengths will be in the visible range, and thus between 350 nm and 750 nm.

Now referring in greater detail to the drawings, FIG. 1 depicts a bandpass filter 1 for light 2 propagating as a light beam 3 in a propagation direction 4, which comprises an areal long-pass filter 5 and an areal short-pass filter 6 connected thereto in series. The sequence of the long-pass filter 5 and the short-pass filter 6 in the propagation direction 4 is not relevant. Even if the long-pass filter 5 and the short-pass filter 6 are depicted as separate components, they are spatially fixed with regard to one another in the bandpass filter 1, and, preferably, they directly follow to one another in the propagation direction 4. For this purpose, thin film systems 7 and 8 which form the long-pass filter 5 and the short-pass filter 6, respectively, and which, according to FIG. 1 are each arranged on an own substrate 9 and 10, may be arranged on a single substrate, like for example on its front and back side, but alternatively even on the same side of the substrate. The long-pass filter 5 defines a lower cut-off wavelength of the bandpass filter 1, whereas the short-pass filter 6 defines an upper cut-off wavelength of the bandpass filter 1. The long-pass filter 5 and the short-pass filter 6 are each areal in that they both extend over an area, i.e. in that they both extend in two spatial dimensions or have two linearly independent directions of main extension. The long-pass filter 5 and the short-pass filter 6 are each formed as gradient filters 11 and 12, respectively, which set different lower or upper cut-off wavelengths, respectively, in different area regions of their planes of main extension. The lower cut-off wavelength which is set by the long-pass filter 5 increases in a first direction 13, whereas the upper cut-off wavelength set by the short-pass filter 6 increases in a second direction 14. The first direction 13 and the second direction 14 are linear directions 15 and 16 which are orthogonal to one another in a projection along the propagation direction 4. In this way, regions of a passage area of the bandpass filter 1 with different combinations of the lower cut-off wavelength and the upper cut-off wavelength are distributed over the plane of main extension of the bandpass filter 1. By means of directing the light beam 3 onto one of these regions, a wavelength range is selected from the light beam which is delimited by the lower and upper cut-off wavelengths belonging to this area region. Via the selection of the region of the passage area of the bandpass filter 1, onto which the light beam 3 is directed, both the position, which may be regarded as being equal to the average of the lower and the upper cut-off wavelengths, and the bandwidth, i. e. the difference between the lower cut-off wavelength and the upper cut-off wavelength, can be selected. Insofar, position and bandwidth of the selected wavelength range are variable in the bandpass filter 1 and selectable within this variability.

Figure 2:
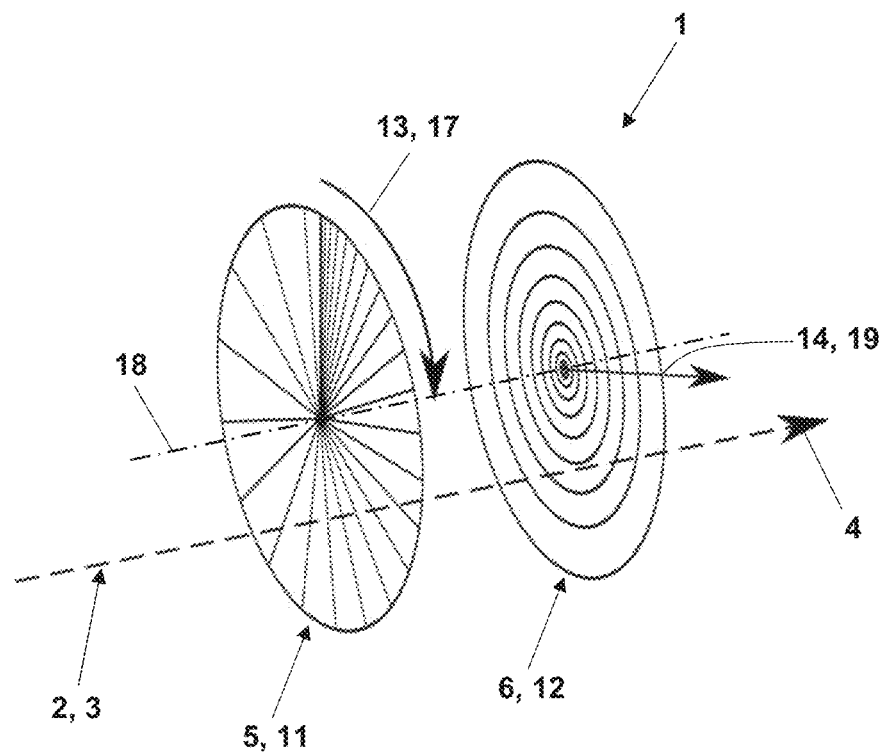
FIG. 2 shows a long-pass filter and a short-pass filter connected thereto in series in a second embodiment of the bandpass filter according to the invention in a schematic perspective depiction.

The embodiment of the bandpass filter 1 according to FIG. 2 differs from the embodiment according to FIG. 1 in that the first direction in which the lower cut-off wavelength of the long-pass filter 5 increases is an azimuthal direction 17 about an optical axis 18 which is parallel to the propagation direction 4 of the light beam 3, and that the second direction 14 in which the upper cut-off wavelength of the short-pass filter 6 increases is a direction 19 orthogonal thereto, which is a radial direction with regard to the optical axis 18. Correspondingly, the regions of the passage area of the bandpass filter which define the different wavelength ranges that are selected by the bandpass filter from the light beam 3 are arranged on circular tracks of different diameters around the optical axis 18.

Figure 3:
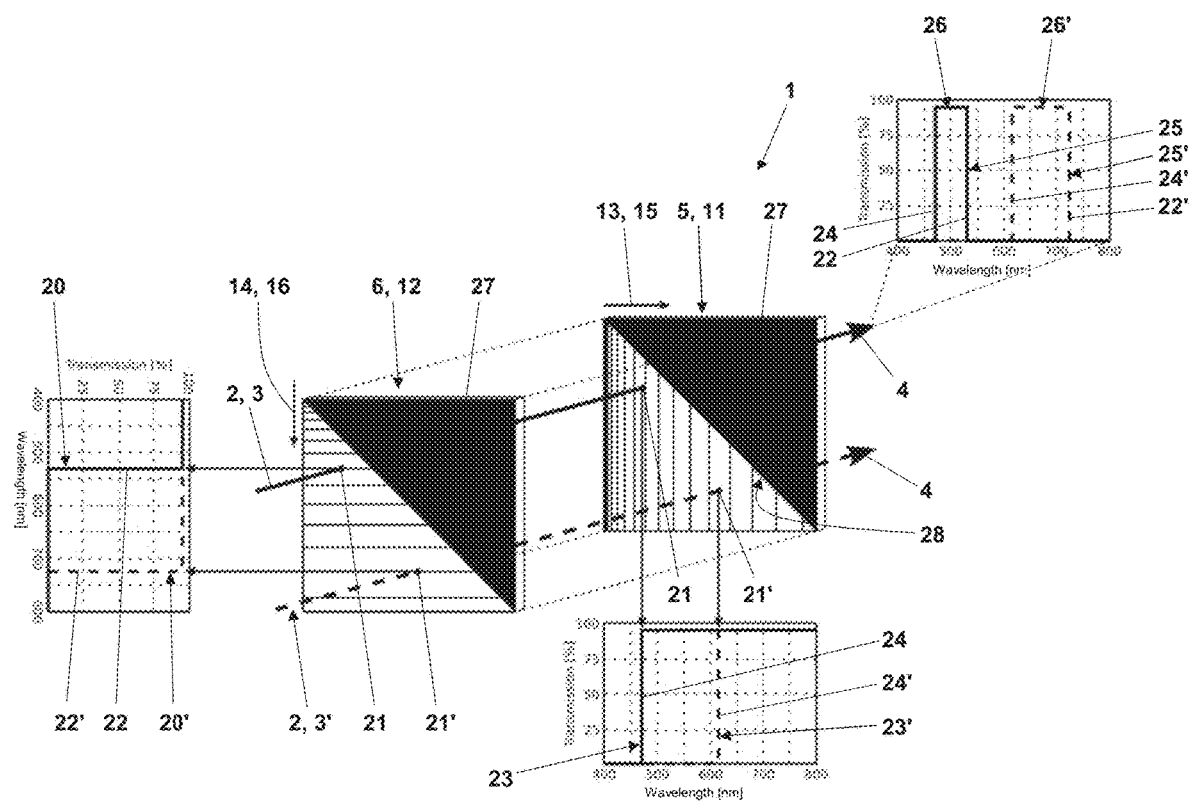
FIG. 3 explains the function of the bandpass filter according to the invention in an embodiment similar to FIG. 1.

FIG. 3 explains the function of the bandpass filter 1 in an embodiment which differs from that one according to FIG. 1 by a reversed sequence of the short-pass filter 6 and the long-pass filter 5 in the propagation direction 4. For the short-pass filter 6 made as a gradient filter 12, those transmission spectra 20 and 20' are depicted which result for different points of incidence 21 and 21' of the light beam 3 or 3' on the bandpass filter 1. The two transmission spectra 20 and 20' differ by different upper cut-off wavelengths 22 and 22'. Further, FIG. 3 shows transmission spectra 23 and 23' of the long-pass filter 5 also made as a gradient filter 11 which result for the points of incidence 21 and 21' of the light beam 3, 3' on the bandpass filter 1. These transmission spectra 23 and 23' have different lower cut-off wavelengths 24 and 24'. Total transmission spectra 25 and 25' in which a passband 26 or 26' is delimited by the lower cut-off wavelength 24 and the upper cut-off wavelength 22 or the lower cut-off wavelength 24' and the upper cut-off wavelength 22', respectively, result from the superposition of the transmission spectra 20 and 23, on the one hand, and 20' and 23', on the other hand. The passband 26 or 26' indicates the wavelength range, which is selected by the bandpass filter 1 from the incident light beam 3, 3' in that it is the only wavelength range passing through the bandpass filter 1. FIG. 3 also indicates a blocking region 27 of the bandpass filter, in which the bandpass filter 1 is not transparent, because the lower cut-off wavelength 24 is higher than the upper cut-off wavelength 22 here. The blocking region 27 makes up a half of the active surface, i. e. the potential passage area of the bandpass filter 1, because the wavelength ranges spanned by the upper cut-off wavelengths 22 and 22' and the lower cut-off wavelengths 24, 24' completely overlap, and further because the upper cut-off wavelengths 22, 22' as well as the lower cut-off wavelengths 24, 24' linearly increase in the linear second direction 14, 16 and the linear first direction 13, 15.

At a boundary 28 of the blocking region 27, those regions of the passage area of the bandpass filter 1 are located, in which the passband 26, 26' has its smallest bandwidth. With increasing distance to the boundary 23, this bandwidth increases. By means of a wavelength range of the lower cut-off wavelengths 24, 24' of the long-pass filter 5 shifted towards smaller wavelengths or a wavelength range of the upper cut-off wavelengths 22, 22' of the short-pass filter 6 shifted towards longer wavelengths, the boundary 28 could be shifted in such a parallel way that the blocking region 27 gets smaller. However, in this way, the wavelength range would be delimited within which passbands 26, 26' of a small bandwidth could be utilized.

Figure 4:
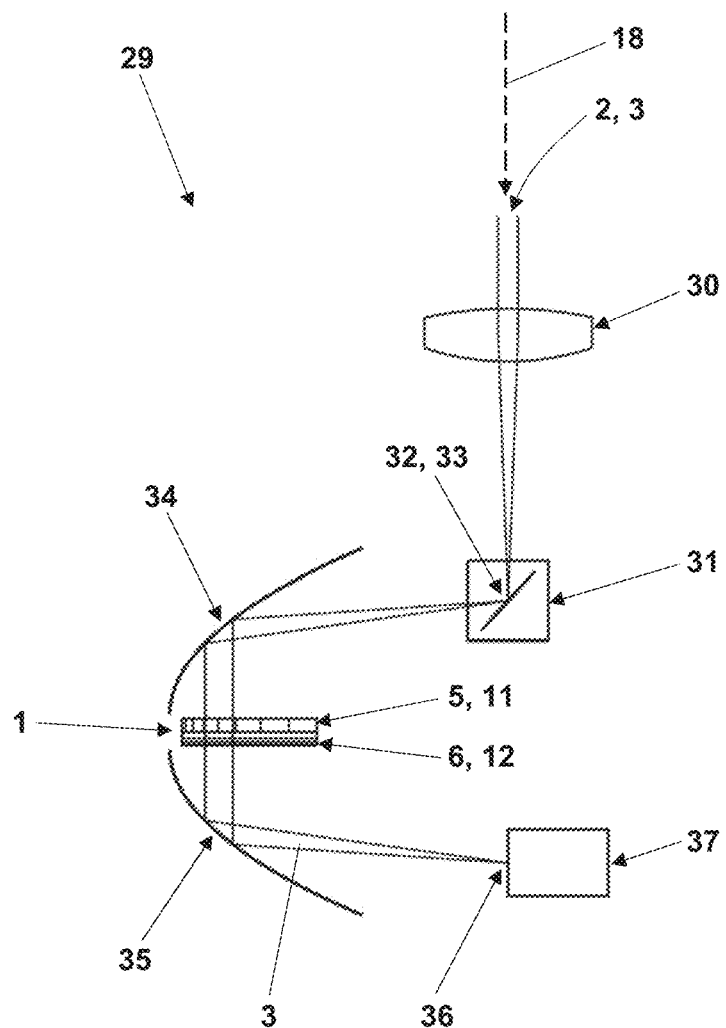
FIG. 4 shows an embodiment of the apparatus according to the invention for selecting a wavelength range, for example in a detection beam path of a laser-scanning microscope.

FIG. 4 shows an apparatus 29 for selecting a wavelength range from a light beam 3 incident along the optical axis 18. The incident light beam 3 is focused by a focusing optic 30 onto a two-axes tilting mirror 31 so that the focal point 32 of the light beam 3 coincides with the tilting point, i. e. the intersection point of the two tilting axes of the tilting mirror 31. The tilting mirror 31 deflects the light beam 3 onto a collimation optic in form of an off-axis parabolic mirror 34. The light beam 3 collimated by the collimation optic gets onto an area region of the bandpass filter 1 which is selectable by means of the tilting mirror 31, both within the drawing plane of FIG. 4 and orthogonal thereto. Downstream of the bandpass filter 1, the collimated light beam having the wavelength range selected by the bandpass filter 1 gets onto a further off-axis parabolic mirror 35 which serves as a focusing optic focusing the light beam 3 in a spatially fixed focal point 36. The focal point 36 is spatially fixed insofar as it does not vary with tilting the tilting mirror 31. Only the angle is varied, at which the light beam 3 gets to the focal point 36. This different angle could be compensated by means of a second two-axes tilting mirror. This second two-axes tilting mirror could be controlled in a same way as the tilting mirror 31, if the two off-axis parabolic mirrors 34 and 35 are symmetrically arranged and designed. In principle, the two off-axis parabolic mirrors 34 and 35 could, however, also have different focal lengths. Then, the two two-axes tilting mirrors could still be to be controlled synchronously in a corresponding way but not for the same angle variations. According to FIG. 4, instead of a further two-axes tilting mirror, a detector 37 is arranged at the spatially fixed focal point 36, which measures the intensity of the light 2 of the light beam 3 in the wavelength range selected by the bandpass filter 1. A point-shaped light detector, which may include an avalanche photodiode or photo-multiplier, is sufficient as the detector 37. Instead of a point-shaped light detector, a two-dimensional light detector, like a CCD- or CMOS-camera, or a light detector array could be used. This two-dimensional light detector could then be arranged directly behind the bandpass filter 1 instead of the off-axis parabolic mirror 35 so that one region of the spatially resolving two-dimensional detector or the detector array would be associated with each region of the passage area of the bandpass filter 1. The apparatus 29 according to FIG. 4 may, for example, be utilized in a detection beam path of a laser-scanning microscope for wavelength selective detection of fluorescence light.

Figure 5:
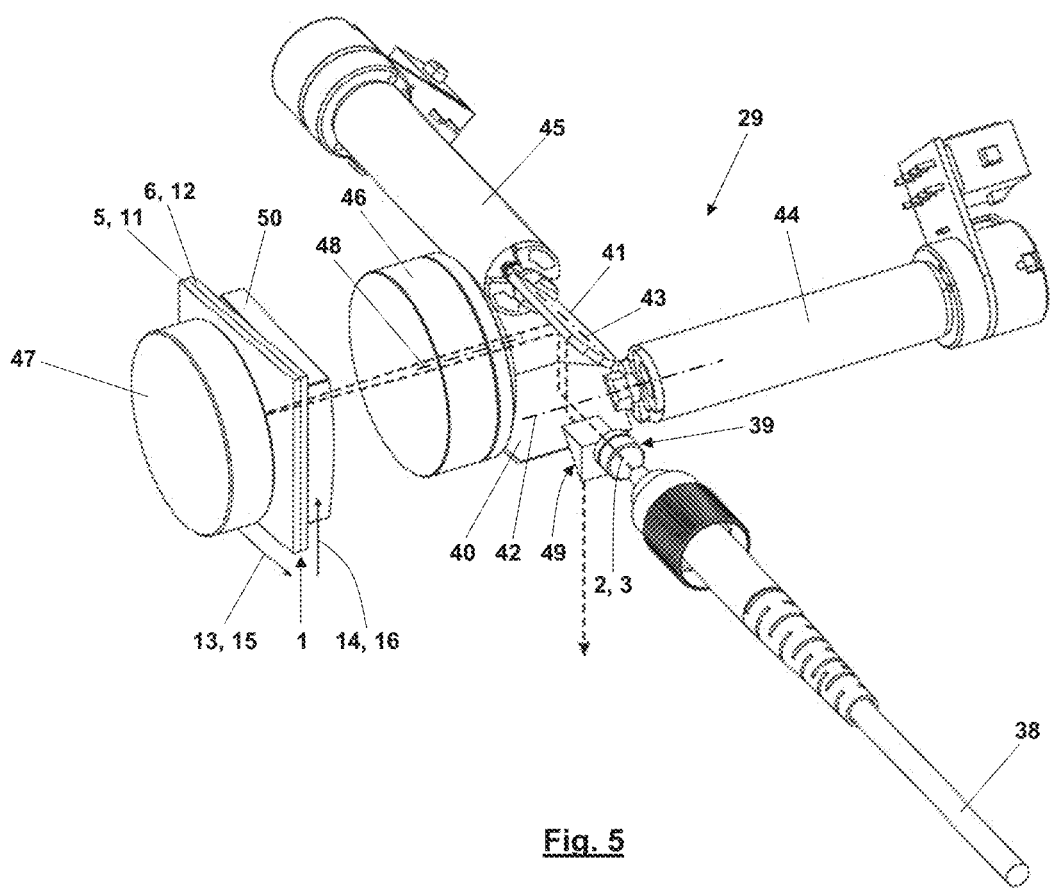
FIG. 5 shows a further embodiment of the apparatus according to the invention for selecting a wavelength range.

The apparatus 29 for selecting a wavelength range from a light beam 3 depicted in FIG. 5 includes a light guide 38 for supplying the light beam 3. The light 2 of the light beam 3 emerging out of the light guide 38 is collimated by a collimating optic 39. The collimated light beam 3 gets, one after the other, on a first one-axis tilting mirror 40 and a second one-axis tilting mirror 41, whose tilting axes 42 and 43 are orthogonal in a projection along the light beam 3. The tilting mirrors 40 and 41 are tiltable about their tilting axes 42 and 43, each by means of a galvo motor 44 or 45, respectively. Such tilting mirrors 40 and 41 are also designated as rotary mirrors. Behind the second tilting mirror 41, the light beam 3 is focused onto the mirror surface of a full mirror 47 by a rotationally symmetric lens 46. The bandpass filter 1 is arranged directly in front of the mirror surface of the full mirror 47. By means of the tilting mirrors 40 and 41, the region of the passage area of the bandpass filter 1 is set, through which the light beam 3 passes on its way to the mirror surface of the full mirror 47 and on its way back from the mirror surface. The double passage of the light beam 3 through this region of the passage area results in that the wavelengths of the light 2 of the light beam 3 which are outside of the selected wavelength range are suppressed stronger than with a single passage only. The bandpass filter 1 is slightly tilted with regard to the mirror surface of the full mirror 47 so that parts of the light beam 3 which are not transmitted but reflected by the bandpass filter 1 are reflected away, i. e. separated from the returning light beam. The light beam 3 returning from the mirror surface of the full mirror 47, after once again passing through the rotationally symmetric lens 46, has a parallel offset with regard to the incident light beam 3, because a rotation axis 48, with regard to which the lens 46 is rotationally symmetric, has a parallel offset with regard to the incident light beam 3 in a zero position of the tilting mirrors 40 and 41. Due to the resulting parallel offset between the incident and the returning light beam 3, the returning light beam 3, after having been de-scanned by the tilting mirrors 40 and 41, can be separated from the incident light beam 3 by means of an edge mirror 49 in front of the collimating optic 39. The tilting axis 42 of the first tilting mirror 40 passes through an input side focal point of the lens 46. Thus, the first tilting mirror 40 tilts the light beam 3 about a fixed point that is the center of a pupil of the lens 26. This strictly applies in a projection along the tilting axis 42 of the first tilting mirror 40. With regard to a projection along the tilting axis 43 of the second tilting mirror 41, a cylinder lens 50 having a cylinder axis parallel to the tilting axis 43 of the second tilting mirror 41, which is arranged close to an output side focal point of the lens 46, selectively shifts an input side focal point of the combination of the lens 46 and the cylinder lens 50 onto the second tilting mirror 41. In other words, the input side focal point of the combination of the lens 46 and the cylinder lens 50 coincides with the tilting axis 43 of the second tilting mirror 41. Thus, in the projection along the tilting axis 43 of the second tilting mirror 41, the second tilting mirror 41 tilts the light beam 3 about a fixed point that is the center of a pupil of the lens combination. In this way, even without imaging the tilting mirrors 40 and 41 onto one another, a tilting of the light beam 3 in two directions which are orthogonal to one another can be achieved without a simultaneous variation of the beam position.

Figure 6:
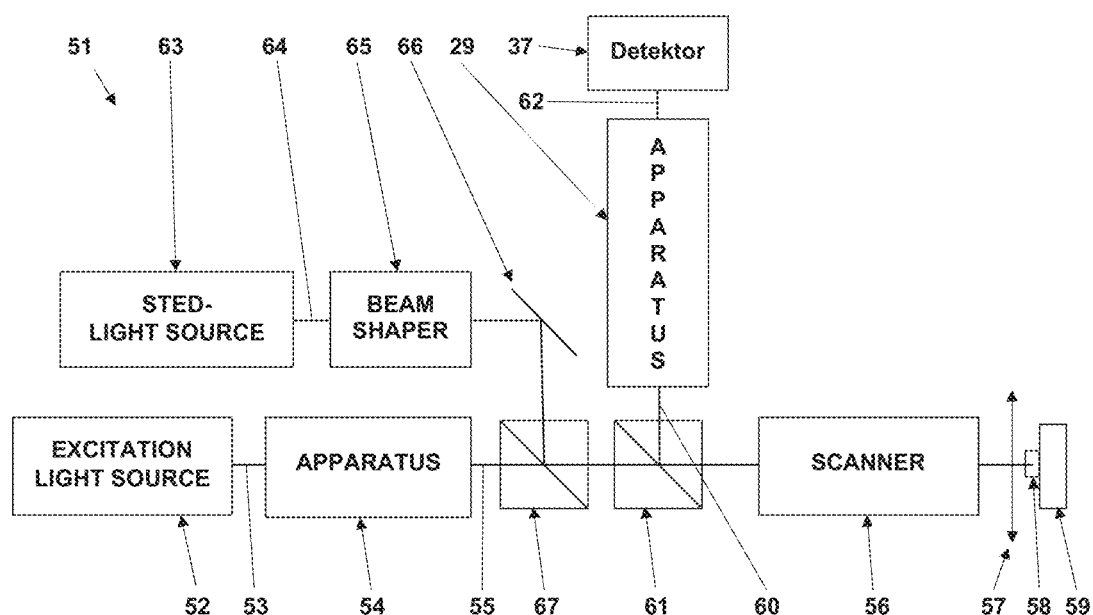
FIG. 6 shows a STED-microscope as an embodiment of the laser-scanning microscope apparatus according to the invention, the STED-microscope comprising one apparatus according to the invention for selecting a wavelength range of excitation light focused into a sample and one apparatus according to the invention for selecting a wavelength range from fluorescence light emitted out of the sample.

FIG. 6 shows a STED-microscope 51 as an example of a laser-scanning microscope comprising the apparatus according to the present disclosure, like, for example, the apparatus 29 according to FIG. 4, in its detection beam path leading to the detector 37. The STED-microscope comprises an excitation light source 52 providing white light 53. A further apparatus 54 according to the present disclosure selects excitation light 55 of a certain wavelength range from the white light 53. Via a scanner 56 and an objective lens 57 the excitation light 55 is directed into a sample 58 arranged on a sample holder 59. The scanner 56 serves for scanning the sample 58 with a local intensity maximum of the excitation light 53 focused into the sample 58 by means of the objective lens 57. Fluorescence light 60 emitted out of the sample and getting into the objective lens is de-scanned by the scanner 56 and separated from the excitation light 53 by means of a dichroic beam splitter 61. The dichroic beam splitter 61 deflects the fluorescence light 60 towards the detector 37. The apparatus 29 arranged in front of the detector 37 selects detection light 61 of a certain wavelength range from the fluorescence light 60. In the STED-microscope 51, the light intensity distribution of the excitation light 55 is superimposed with a light intensity distribution of fluorescence inhibition or STED-light 64 in the sample 8. The STED-light 64 is supplied by an STED-light source 63. A beam shaper 65 shapes the beam of the STED-light in such a way that the intensity distribution in the sample 8 displays a local intensity minimum. This local intensity minimum is enclosed by such high intensity maxima of the STED-light 64 that the STED-light 64 inhibits the emission of fluorescence light 60 out of the sample 58 over the entire intensity maximum of the intensity distribution of the excitation light 55 except of a spatially delimited region of its local intensity minimum. The beam path of the fluorescence inhibition light 64 is combined with the beam path of the excitation light 55 by means of a full mirror 66 and a further dichroic beam splitter or beam combiner 67.

Many variations and modifications may be made to the preferred embodiments of the invention without departing substantially from the spirit and principles of the invention. All such modifications and variations are intended to be included herein within the scope of the present invention, as defined by the following claims.

We claim:

1. A bandpass filter for light having variable lower and upper cut-off wavelengths, the bandpass filter comprising an areal long-pass filter defining the variable lower cut-off wavelength, wherein the long-pass filter has different lower cut-off wavelengths in different first area regions which follow to one another in a first direction, and an areal short-pass filter defining the variable upper cut-off wavelength, wherein the short-pass filter has different upper cut-off wavelengths in different second area regions which follow to one another in a second direction, wherein the long-pass filter and the short-pass filter are connected in series, wherein the long-pass filter and the short-pass filter are spatially fixed relative to one another, and wherein the first direction and the second direction are oriented crosswise to one another.

2. The bandpass filter of claim 1, wherein the long-pass filter and the short-pass filter are connected in series in a beam path of the light, wherein the first direction and the second direction are oriented crosswise to one another in a projection along the beam path.

3. The bandpass filter of claim 2, wherein the first direction and the second direction, in the projection along the beam path, are
linear directions which are orthogonal to one another, or
a radial direction and an azimuthal direction with regard to an optical axis of the beam path.

4. The bandpass filter of claim 1, wherein the long-pass filter and the short-pass filter are arranged parallel to one another and rigidly connected to one another.

5. The bandpass filter of claim 4, wherein the long-pass filter and the short-pass filter are cemented to one another.

6. The bandpass filter of claim 4, wherein a first thin film system forming the long-pass filter and a second thin film system forming the short-pass filter are arranged on a same substrate.

7. The bandpass filter of claim 1, wherein the lower cut-off wavelengths of the long-pass filter monotonically increase in the first direction and the upper cut-off wavelengths of the short-pass filter monotonically decrease in the second direction.

8. The bandpass filter of claim 7, wherein the lower cut-off wavelengths of the long-path filter strictly monotonically or linearly increase in the first direction and the upper cut-off wavelengths of the short-pass filter strictly monotonically or linearly decrease in the second direction.

9. The bandpass filter of claim 8, wherein a first gradient of the upper cut-off wavelengths of the long-pass filter in the first direction and a second gradient of the upper cut-off wavelengths of the short-pass filter in the second direction have a same constant value.

10. The bandpass filter of claim 1, wherein a first wavelength range spanned by the lower cut-off wavelengths of the long-pass filter in the first direction and a second wavelength range spanned by the upper cut-off wavelengths of the short-pass filter in the second direction overlap one another by at least 50%.

11. The bandpass filter of claim 1, wherein a first wavelength range spanned by the lower cut-off wavelengths of the long-pass filter in the first direction and a second wavelength range spanned by the upper cut-off wavelengths of the short-pass filter in the second direction overlap one another by about 100%.

12. An apparatus for selecting a wavelength range from a light beam, the apparatus comprising a bandpass filter of claim 1 and a beam shifting device which is configured to shift the light beam, transversely with regard to its propagation direction, relative to the bandpass filter.

13. The apparatus of claim 12, wherein a point-shaped or two-dimensional light detector is arranged behind the bandpass filter.

14. The apparatus of claim 12, wherein the beam shifting device is configured to shift the light beam in two different directions, transversely with regard to its propagation direction, relative to the bandpass filter.

15. The apparatus of claim 12,
wherein the beam shifting device comprises
a two-axes tilting mirror,
an optic focusing the light beam onto the tilting mirror,
an off-axis parabolic mirror collimating the light beam deflected by the tilting mirror, and
a further off-axis parabolic mirror focusing the collimated light beam onto a spatially fixed focal point,
wherein the bandpass filter is arranged between the two off-axis parabolic mirrors.

16. The apparatus of claim 12,
wherein the beam shifting device comprises
a light guide supplying the light beam,
an optic collimating the light beam emerging from the light guide,
a first one-axis tilting mirror and a second one-axis tilting mirror which deflect the collimated light beam one after the other into two different directions,
a full mirror for the deflected light beam,
a lens combination focusing the deflected light beam perpendicularly onto the full mirror and including a lens which is rotationally symmetric with regard to a rotation axis, and
an edge mirror separating the light beam reflected by the full mirror from the light beam emerging from the light guide and collimated by the collimating optic,
wherein the bandpass filter is arranged closely in front of the full mirror and tilted to such an extent with regard to the full mirror that a component of the light beam reflected by the bandpass filter and having wavelengths outside the wavelength range selected by the bandpass filter is reflected by the bandpass filter out of the continued beam path,
wherein the light beam which has the selected wavelength range and which is reflected by the full mirror is once again collimated and de-scanned by the tilting mirrors when passing once again through the lens combination in opposite direction, and
wherein, at zero excursion of the tilting mirrors, the rotation axis of the rotationally symmetric lens is arranged relative to a beam axis at such a parallel offset that the light beam reflected by the full mirror, after passing through the lens combination, is laterally shifted with regard to the incident light beam to such an extent that it is separable from the light beam, which emerges out of the light guide and which is collimated by the collimating optic, by means of the edge mirror.

17. The apparatus of claim 16,
wherein the two different directions, in which the two tilting mirrors deflect, are orthogonal to each other,
wherein the tilting axis of the first tilting mirror passes through an input-side focal point of the rotationally symmetric lens, and
wherein the lens combination further includes a cylinder lens, which has a cylinder axis that is parallel to the tilting axis of the second tilting mirror, which is arranged close to the full mirror and which, in a projection along the tilting axis of the second tilting mirror, shifts an input-side focal point of the lens combination onto the tilting axis of the second tilting mirror.

18. A laser-scanning microscope comprising at least one apparatus of claim 12 in at least one of its excitation beam path and its detection beam path.

* * * * *